July 17, 1956 C. F. HAMMOND 2,754,924
MANUAL AND HYDRAULIC POWER ACTUATED STEERING GEAR
Filed June 15, 1953 4 Sheets-Sheet 1

INVENTOR.
CHARLES F. HAMMOND
BY
Whittemore Hulbert & Belknap
ATTORNEYS

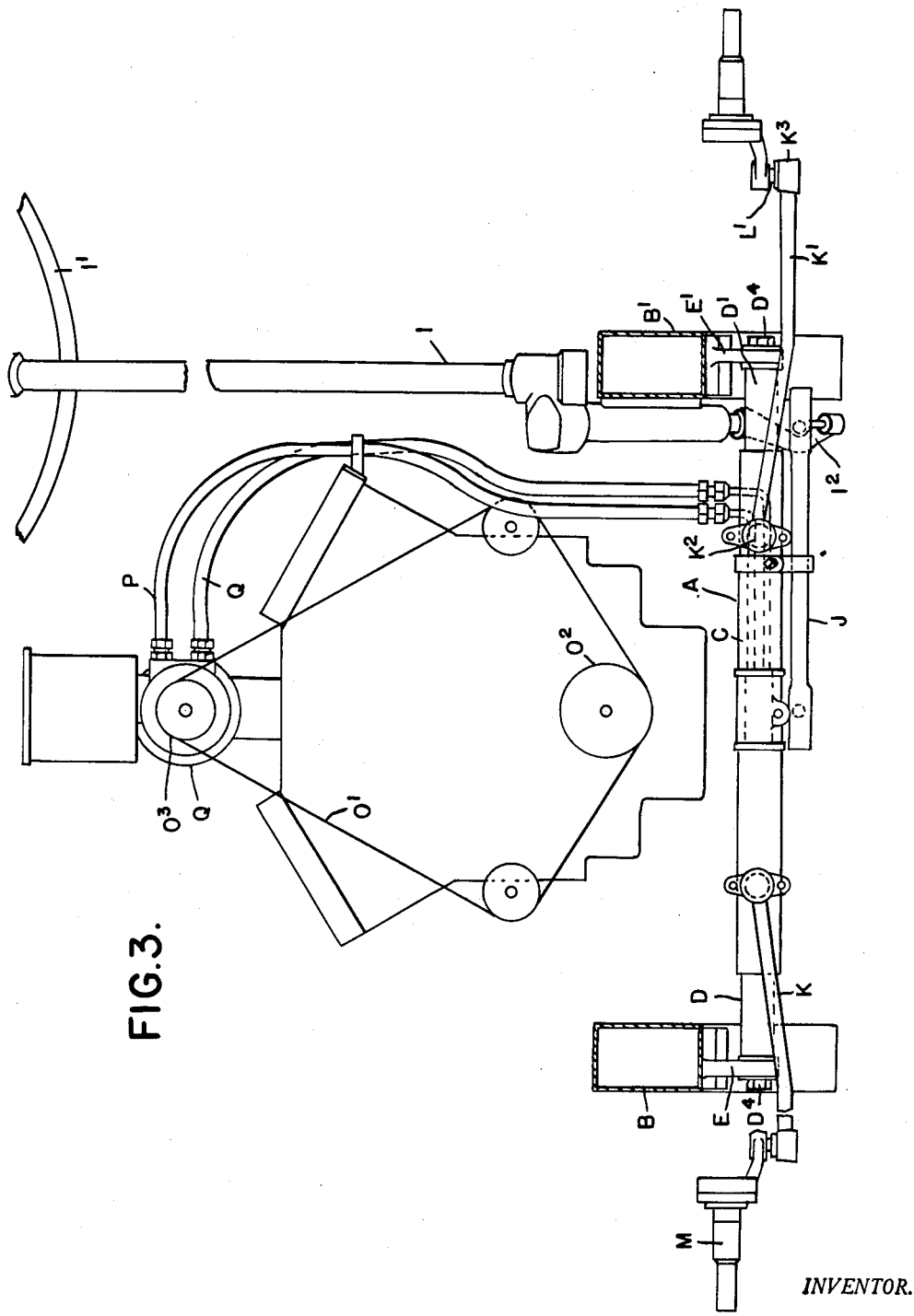

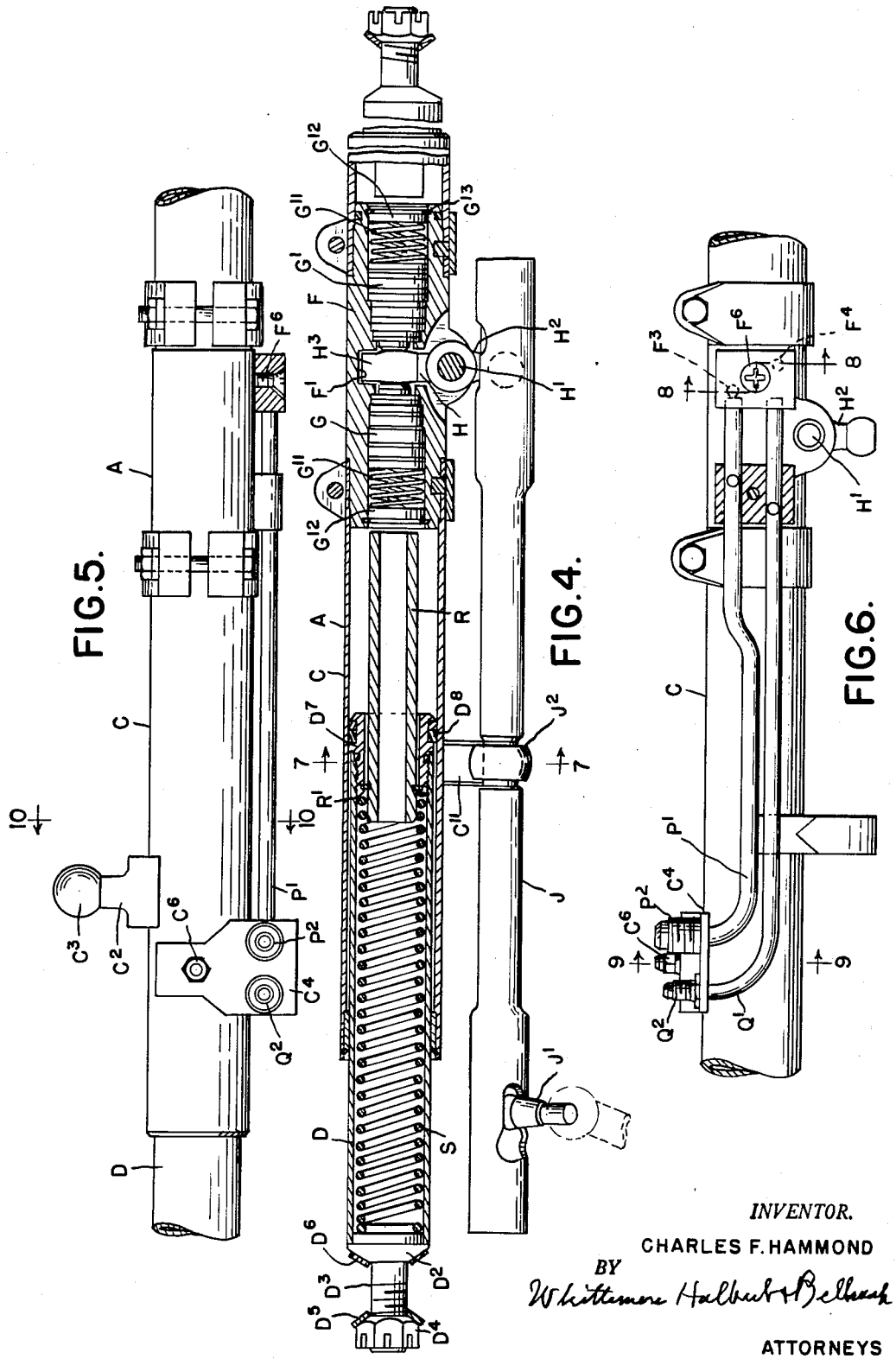

July 17, 1956  C. F. HAMMOND  2,754,924
MANUAL AND HYDRAULIC POWER ACTUATED STEERING GEAR
Filed June 15, 1953 4 Sheets-Sheet 4
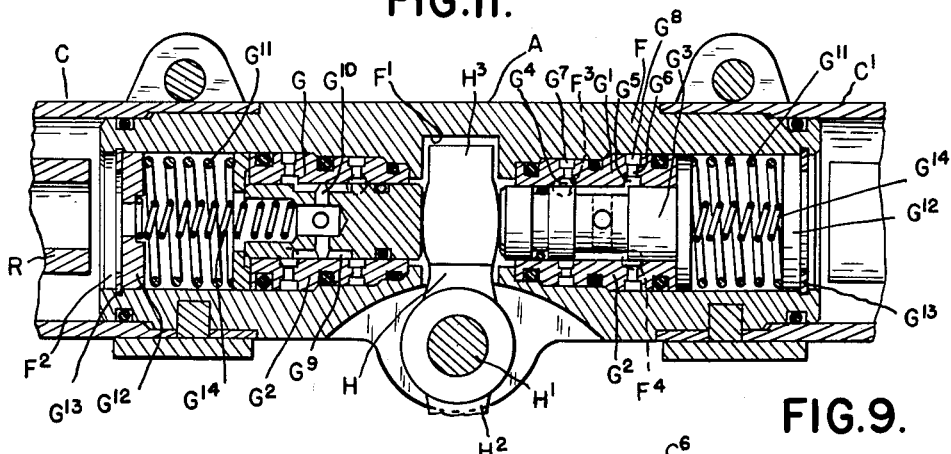
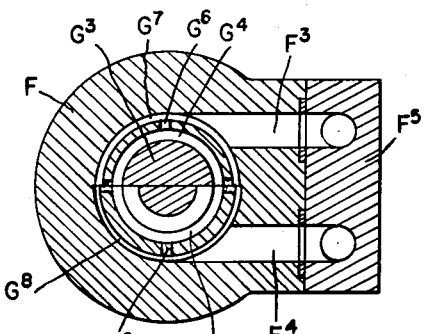
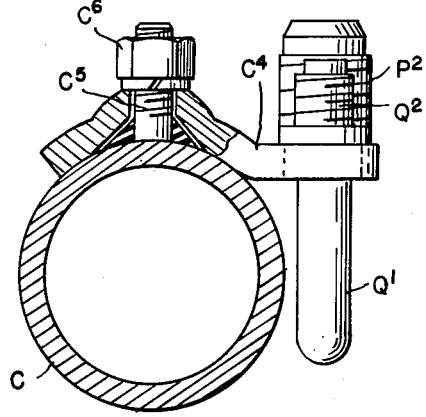
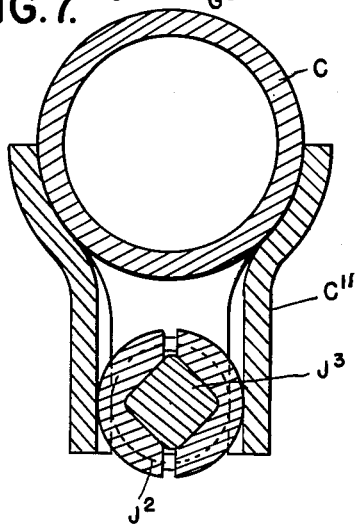
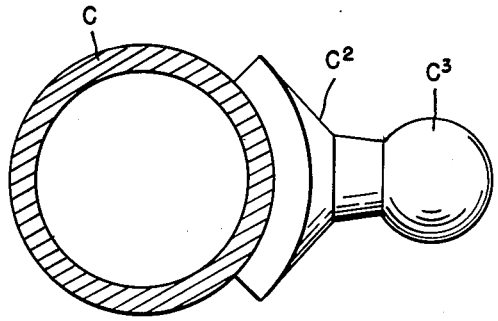
INVENTOR.
CHARLES F. HAMMOND
BY
*Whittemore Hulbert & Belknap*
ATTORNEYS United States Patent Office 2,754,924
Patented July 17, 1956

2,754,924

MANUAL AND HYDRAULIC POWER ACTUATED STEERING GEAR

Charles F. Hammond, Grosse Pointe, Mich., assignor to Gemmer Manufacturing Company, Detroit, Mich., a corporation of Michigan Application June 15, 1953, Serial No. 361,486

4 Claims. (Cl. 180—79.2)

The invention relates to manual and power actuated steering gears of that type in which a power motor is located between the steering column and the dirigible ground wheels. It is one of the objects of the invention to obtain a construction of this type in which the motor is mounted on the frame of the vehicle to be carried thereby, while at the same time, forming a portion of the linkage between the mechanism in the steering column and the dirigible wheels. It is a further object to obtain a construction which is simple, sturdy, low in friction losses and applicable to any standard construction of manually operable steering mechanism, with a minimum of changes therein or in the vehicle to which it is applied. With these objects in view, the invention consists in the construction as hereinafter set forth.

In the drawings:

Fig. 3 is an end elevation;

Fig. 4 is a longitudinal section through the power motor and connections with portions shown in elevation;

Fig. 5 is a plan view of a portion of the motor and its connections;

Fig. 6 is an elevation of the portion shown in Fig. 5 viewed from the rear side;

Fig. 7 is a cross section on line 7—7, Fig. 4;

Fig. 8 is a cross section on line 8—8, Fig. 6;

Fig. 9 is a cross section on line 9—9, Fig. 6;

Fig. 10 is a cross section on line 10—10, Fig. 5; and

Fig. 11 shows a cross section of the valve mechanism.

Figure 2:
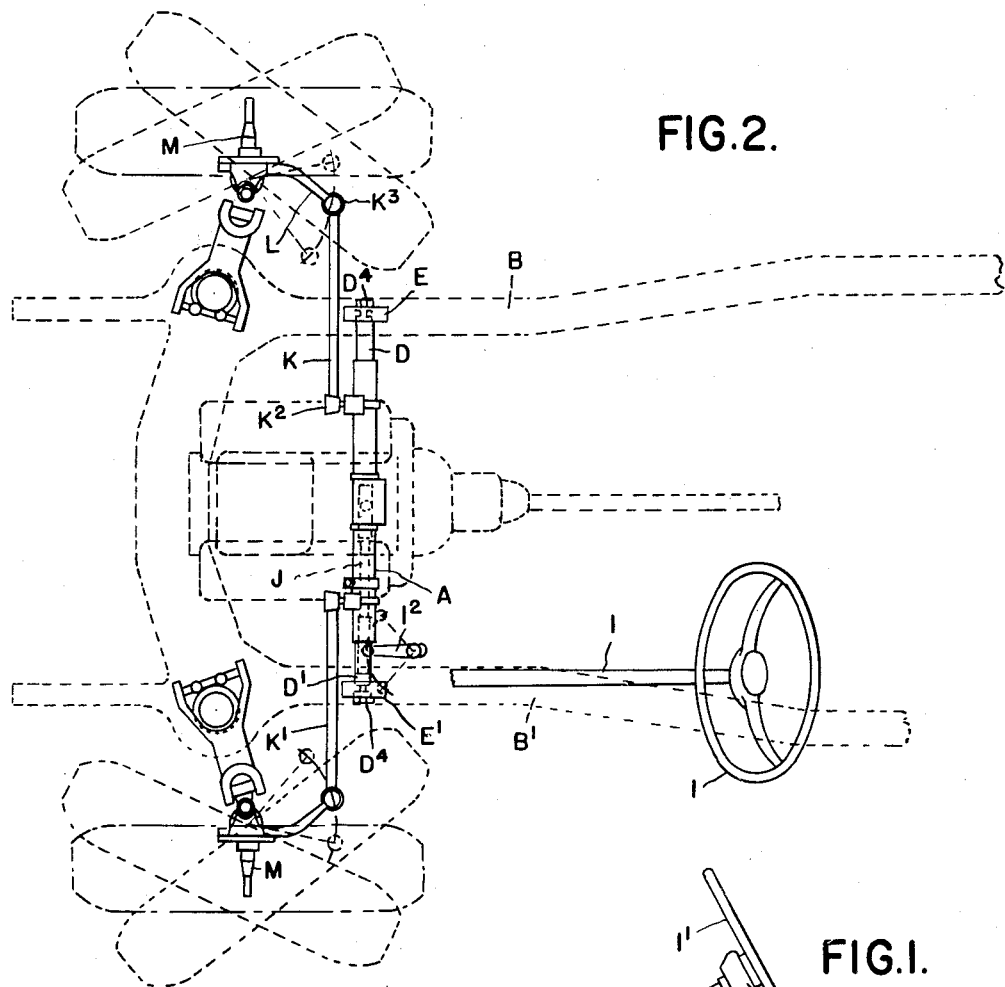
Fig. 2 is a plan view thereof.

In the application of power motors to steering gears for motor vehicles, one type which has been heretofore devised, locates the motor in the reach connection between the rock arm on the steering column and the dirigible ground wheels. The weight of the motor and its connections must thus be carried by this reach member which adds to the inertial load subject to displacement by road shocks or other changes in direction of movement. It is one of the objects of my invention to support the motor on the frame of the vehicle while at the same time utilizing the movable member thereof as a part of the linkage between the steering column and the dirigible wheels through which, if necessary, the steering gear may be manually operated.

As shown, A is the motor which is located to extend transversely between side sills B and B' of the motor vehicle frame and slightly below the horizontal plane thereof. This motor A comprises telescopically engaged members constituting cylinders and pistons and as specifically shown, the cylinders C and C' are central and the pistons D and D' are at opposite ends. However, this arrangement might be reversed, the pistons being central and the cylinders at the ends. The opposite end members are fixedly secured by brackets E and E' to the sills B and B'. Both the cylinder and the pistons are chiefly formed of telescopically engageable commercial tubing which is of sufficient diameter to avoid danger of bending under any stresses or shocks to which the structure may be subjected. In addition to the tubular portions, the cylinders C, C' have therebetween a central valve holding portion F containing piston valves G and G' co-axial with the tubing. Between these valves is an actuating lever H having a pivot fulcrum H' on the lower side of the member F and a downwardly extending actuating arm $H^2$. An arm $H^3$ extending upward from the pivot is between the pistons of the valves and also extends into a recess F' beyond the valves which provides a slight clearance permitting only limited rocking of the lever on its fulcrum. However, this movement is sufficient for actuating the valve as will be later described.

*Valve construction*

Each of the valves G and G' has a cylinder member $G^2$ which is seated in an end opening recess $F^2$ in the member F and also a piston $G^3$ slidable in the cylinder. The cylinder $G^2$ has axially spaced internal annular grooves $G^4$ and $G^5$ which are respectively connected by radial ports $G^6$ with registering external annular grooves $G^7$ and $G^8$. The groove $G^7$ registers with a channel $F^3$ extending rearwardly in the member F and the groove $G^8$ similarly registers with a rearwardly extending channel $F^4$. These channels form portions of the hydraulic circuit to be later described. Each of the pistons $G^3$ has an external annular groove $G^9$ of sufficient width to slightly overlap both of the grooves $G^4$ and $G^5$ of the cylinder in the normal position of the piston. The groove $G^9$ connects by radial ports $G^{10}$ with the interior of the piston which is hollow and open at the end opposite that engaging the lever H. Thus, each valve in normal position establishes fluid communication from the channel $F^3$ to the channel $F^4$ and also between said channels and the recess $F^2$ which opens into one of the cylinders C and C'. The valve cylinders $G^2$ which are introduced into the recesses $F^2$ through the open ends thereof are retained therein by coil springs $G^{11}$ bearing against annular abutments $G^{12}$. The latter are secured in the sockets by snap rings $G^{13}$ engaging annular grooves. These members $G^{12}$ also form abutments for light coil springs $G^{14}$ which bear against the piston $G^3$ to hold them against the lever H.

*Pistons*

As above stated, each of the pistons D and D' is chiefly formed of tubing of an external diameter to telescopically engage with the cylinders C and C'. At the outer end of the tubing is a head member $D^2$ welded or otherwise rigidly secured thereto and this head member has an outwardly extending threaded shank $D^3$. The latter extends through an aperture in the bracket E or E' and is secured thereto by a nut $D^4$. Preferably both the head $D^2$ and nut $D^4$ have conical faces for engaging corresponding conical faces on the bracket, and washers $D^5$ and $D^6$ are placed on each side of the bracket to cushion the joint. At the inner end of each piston is an annular head member $D^7$ threadedly engaged with the tubing and having an external annular groove for a sealing ring $D^8$ of any suitable construction.

*Manually operated steering mechanism*

The manually operated steering mechanism may be of any suitable construction, but as shown, there is the steering column I with the hand wheel I' at its upper end for communicating motion through a steering stem and gearing (not shown) to the rock arm $I^2$ at the base of the column I. This rock arm actuates the dirigible ground wheels through connections including the cylinders C and C' and member F so that when the motor is not in operation the steering may be manually performed. The elements which cooperate with the members C, C' and F in forming the reach connection between the rock arm $I^2$ and the dirigible wheels include a drag link J connecting said rock arm to the actuating arm H² of the lever H and rods K and K' which connect the cylinder to the actuating arm L of the wheel axles M. The drag link J has a universal pivotal connection to the rock arm I² which, as shown, includes a pin J' connected to the rock arm having a spherical end portion engaging a spherical socket in the drag link. The actuating arm H² also has a spherical end portion engaging a spherical socket in the opposite end portion of the drag link J. This rod connection having universal pivots at its opposite ends might tend to rotate the cylinder C which would be detrimental and I have therefore provided an intermediate bearing for the rod on the cylinder C. This, as shown in Figs. 4 and 7, comprises a spherical member J² which slidably engages a polygonal portion J³ of the drag link J intermediate the ends thereof, and a bifurcated bracket member C'' secured to and projecting from the cylinder C to embrace the members J². The bracket C'' is preferably formed of separate members welded or otherwise secured to the cylinder and each fashioned to form a groove of segmental cross section for fitting the spherical member. Thus, while the drag link J is free to move outward or inward in the bracket C'', it is held in a plane passing through the axis of the cylinder C. If this plane is also perpendicular to the axis of the work arm I² there will be no rotation of the cylinders C and C'. However, if not exactly perpendicular the rotation will still be limited. Each of the rods K and K' is attached to the cylinder C by a bracket C² secured to and projecting from one side of the cylinder and having a spherical end portion C³. The latter engages a spherical socket K² at the end of the rod to form a universal pivotal connection. The opposite end of the rod has a spherical socket K³ engaging a ball head on a pin L' of the arm L.

Hydraulic system

Figure 1:
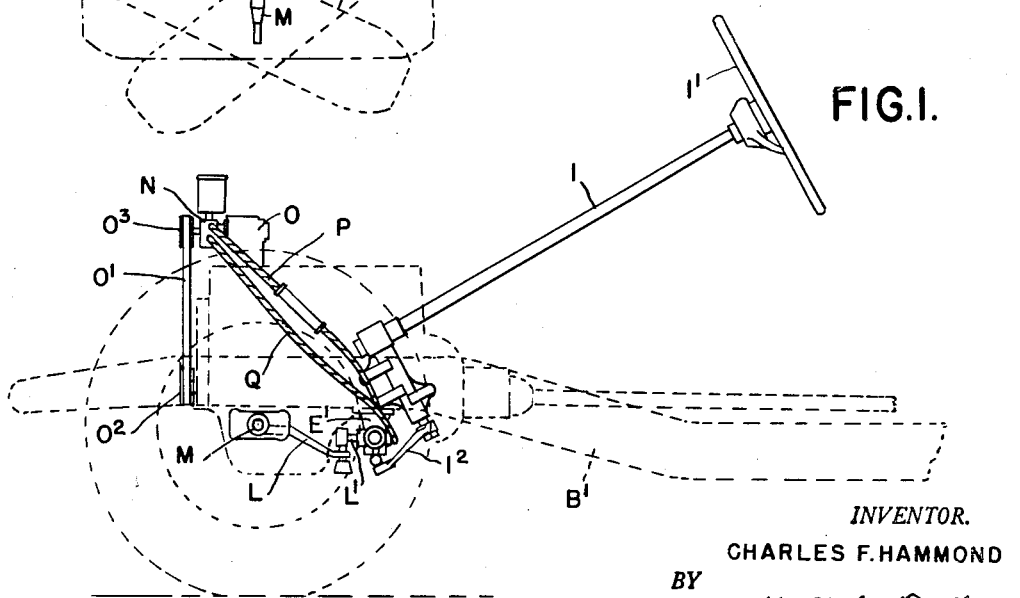
Fig. 1 is a side elevation of a road motor vehicle to which my improved steering mechanism is applied.

The motor A is operated by hydraulic fluid in a fluid circuit including the valve members, a pump and conduit connections therebetween. As shown in Fig. 1, the rotor of a rotary hydraulic pump N is mounted on the same shaft as the electric generator O and is driven by a belt O' and pulleys O² and G³ respectively on the engine crankshaft and the generator shaft. Without describing the pump in detail it will be understood that it propels hydraulic fluid through a conduit P leading to the valve mechanism and through a return conduit Q from said mechanism back to the pump. Portions P' and Q' of these conduits are mounted on the cylinder C and are secured thereto by a bracket C⁴. This bracket, as shown in Fig. 9, is secured to the top of the cylinder C by a threaded stud C⁵ and nut C⁶ and projects laterally towards the rear. The conduit portions P' and Q' are rigid and extend from the bracket C⁴ downward and longitudinally of the cylinder C to the member F. As previously described, this member F has pairs of channels F³ and F⁴ therein extending rearwardly from registration with the grooves G⁴ and G⁵ of each of the valve cylinders. Cover plates F⁵ for these channels secured to the member F by tap bolts F⁶ have also connected thereto the conduits P' and Q', the former connecting with the channels F³ of each pair and the latter to the channels F⁴ thereof. At the ends of the conduit portions P' and Q' which are secured to the bracket C⁴ are coupling members P² and Q² for attaching the same to flexible portions of the conduits extending to the pump. Thus, whenever the engine of the motor vehicle is in operation, hydraulic fluid will be propelled through the circuit, but when the valves are in neutral position, the motor A will be idle.

Operation

With the construction as thus far described, the steering gear may be manually operated when the vehicle engine is not in operation. However, whenever the engine is running, fluid will be propelled through the circuit conditioning the motor A for operation under control of a hand wheel I'. Movement of this hand wheel in either direction will, through the mechanism in the steering column rock arm I² and the drag link J, rock the lever H within the limits provided by the socket F'. This slight movement is sufficient to shift one of the valves G, G' from a position where the groove G⁹ of the piston overlaps both grooves G⁴ and G⁵ of the cylinder to a position where the port to the groove G⁴ is enlarged and communication with the groove G⁵ is cut off. At the same time, the other of the valves G, G' will have its piston actuated by the spring G¹⁴, so as to cut off communication between the groove G⁹ and G⁴ and enlarge the passage between G⁹ and G⁵. This results in flow of fluid into the cylinder chamber controlled by the first valve and the exhausting of fluid from the chamber controlled by the second valve, thereby actuating the cylinder C in a direction corresponding to the turning of the hand wheel. The movement of the cylinder will follow movement of the hand wheel, but when the latter ceases, the valves will be restored to neutral position.

Supplemental recovery means after turning

With modern motor vehicles, recovery after making a turn is effected largely through tire reaction or through a caster effect of the ground wheels. With my power actuated steering mechanism the same means is used but I have provided additional means for insuring a quick recovery which is of the following construction. Within each of the chambers of the cylinder F there is a member R shown as a piece of tubing, which extends from adjacent to the member F at one end into the hollow piston D, D'. Within the latter is a coil spring S abutting against the head D² and with its opposite end engaging a shoulder on the member R formed by a snap ring R' engaging a groove in said member. This snap ring also forms a stop which limits inward movement of the member R by contacting with the end of the annular head D⁷. With such construction when the cylinder C is shifted towards one of the pistons D, contact will be made with the inner end of the member R and in further movement will compress the spring S. During recovery, the pressure of the spring S will assist in returning the cylinder C to central position instead of depending solely upon differential fluid pressures in the cylinder chambers on opposite sides of the valve.

What I claim as my invention is:

1. In a manually and hydraulic power actuated steering mechanism for road vehicles including a pump actuated hydraulic circuit, a hydraulic motor unit extending transversely across the vehicle frame and connected to opposite side members thereof, said unit comprising telescopically engaged tubing including end tubes closed at their outer ends and an open ended central tube, the latter having a partition therein dividing it into separate chambers, links connecting said central tube to the actuating means for the dirigible wheels, a drag link connecting the manually operable portion of said steering mechanism to said central tube, hydraulic connections from said hydraulic circuit for supplying fluid under pressure to and retaining it from said separate chambers, and valve means for controlling said connections actuated by the initial operation of said manually operated means.

2. The construction as in claim 1 in which said partition forms a housing for a pair of aligned piston valves constituting said valve means and respectively controlling the connections to said separate chambers.

3. The construction as in claim 2 in which a lever fulcrumed on said partition intermediate said piston valves and connected to said drag link forms the direct valve actuating means.

4. The construction as in claim 3 having stops on said partition limiting the angular movement of said lever to only that required for operating said valves.

References Cited in the file of this patent

UNITED STATES PATENTS

| 867,282 | Macfarren | Oct. 1, 1907 |
| 2,053,272 | Eaton | Sept. 8, 1936 |
| 2,220,339 | Leathem | Nov. 5, 1940 |
| 2,450,126 | Fisher | Sept. 28, 1948 |
| 2,487,618 | Twyman | Nov. 8, 1949 |

FOREIGN PATENTS

| 866,179 | France | June 27, 1941 |